US012809029B2

(12) United States Patent
Brodehl et al.

(10) Patent No.: US 12,809,029 B2
(45) Date of Patent: Nov. 24, 2026

(54) REAL-TIME SIMULATION OF A LASER BEAM SCANNING OF A COMPLEX OF SMALL OBJECTS

(71) Applicant: dSPACE GmbH, Paderborn (DE)

(72) Inventors: Christoph Brodehl, Paderborn (DE); Christian Esch, Paderborn (DE); Erik Kuehn, Paderborn (DE)

(73) Assignee: dSpace GmbH, Paderborn (DE)

( * ) Notice: Subject to any disclaimer, the term of this patent is extended or adjusted under 35 U.S.C. 154(b) by 322 days.

(21) Appl. No.: 18/755,582

(22) Filed: Jun. 26, 2024

(65) Prior Publication Data

US 2024/0427021 A1 Dec. 26, 2024

(30) Foreign Application Priority Data

Jun. 26, 2023 (DE) ..................... 10 2023 116 778.2
Jul. 6, 2023 (DE) ..................... 10 2023 117 887.3

(51) Int. Cl.
*G01S 17/894* (2020.01)
*G01S 7/481* (2006.01)
*G01S 17/42* (2006.01)

(52) U.S. Cl.
CPC .......... *G01S 17/894* (2020.01); *G01S 7/4817* (2013.01); *G01S 17/42* (2013.01)

(58) Field of Classification Search
None
See application file for complete search history.

(56) References Cited

U.S. PATENT DOCUMENTS 11,592,524 B2 * 2/2023 Chen ..................... G01S 7/4802
12,535,584 B2 * 1/2026 Scharf ..................... G01S 7/487
2007/0018996 A1 1/2007 Wang et al.
2020/0142032 A1 * 5/2020 Chen ..................... G01S 17/931
2022/0099805 A1 * 3/2022 Zhou ..................... G01S 17/931
2022/0260706 A1 8/2022 Junginger et al.
2023/0003856 A1 * 1/2023 Broers .................... G01S 17/88
(Continued)

OTHER PUBLICATIONS

Sun, Guoqing, and K. Jon Ranson. "Modeling lidar returns from forest canopies." IEEE Transactions on geoscience and remote sensing 38.6 (2000): 2617-2626. (Year: 2000).*
(Continued)

*Primary Examiner* — Shawn Decenzo
(74) *Attorney, Agent, or Firm* — Muncy, Geissler, Olds & Lowe, P.C

(57) ABSTRACT

A real-time simulation of a laser beam scanning of a complex of small objects. The device includes a virtual environment with a monolithic 3D model of the complex of small objects, and a sensor simulation for simulating a sensor for measuring distance with the aid of a laser beam. A ray casting routine simulates a laser beam. A distortion routine ascertains an angle of incidence of the laser beam on a surface of the 3D model and selects an intensity distribution assigned to the ascertained angle of incidence from a database. An intensity portion of a reflection of the laser beam is read out as a function of a penetration depth of the laser beam into the complex of small objects. The distortion routine calculates a distorted distance measurement to simulate a plurality of reflections of the laser beam on a plurality of small objects.

12 Claims, 2 Drawing Sheets

(56) References Cited

U.S. PATENT DOCUMENTS

2023/0350065 A1* 11/2023 Yun ........................ G01S 17/89

OTHER PUBLICATIONS

Yun, Ting, et al. "Simulation of multi-platform LiDAR for assessing total leaf area in tree crowns." Agricultural and Forest Meteorology 276 (2019): 107610. (Year: 2019).*
Goodwin, N. R., N. C. Coops, and D. S. Culvenor. "Development of a simulation model to predict LiDAR interception in forested environments." Remote Sensing of Environment 111.4 (2007): 481-492. (Year: 2007).*
Jean-Emmanuel Deschaud et al., "Automatic Data Driven Vegetation Modeling for Lidar Simulation", IEEE, 2012, pp. 5030-5036.
Angela M. Kim et al., "Simulated full-waveform LiDAR compared to Riegl VZ-400 terrestrial laser scans", Proc of SPIE, 2016, 14 pages, vol. 9832.
Nuno R. Leonor et al., "A 2D Ray-Tracing Based Model for Micro- and Millimeter-Wave Propagation through Vegetation", IEEE, Dec. 2014, pp. 6443-6453, vol. 62, No. 12.
Nuno R. Leonor et al., "A 3-D Model for Millimeter-Wave Propagation through Vegetation Media Using Ray-Tracing", IEEE, Jun. 2019, pp. 4313-4318, vol. 64, No. 6.
Abhijeet Tallavajhula et al., "Off-Road Lidar Simulation with Data-Drivin Terrain Primitives", IEEE, 2018, pp. 7470-7477.
Xiang Xu et al., "Simulation of Realistic Water on 3D Game Scene", SciVerse ScienceDirect, pp. 1819-1823.
Jannik Redenius et al: "Simulation von Laserscannern in Pflanzenbestaended fuer die Entwicklung umfeldbasierter Funktion" (Simulation of laser scanners in plant populations for the development of environment-based functions) Feb. 2018, Lecture Notes in Informatics, Gesellschaft fuer Informatik, Bonn 2018, pp. 195-198.
Jannik Redenius et al: "A multilevel Simulation Framework for Highly Automated Harvest Processes enabled by Environmental Sensor Systems" Nov. 2017, WDI-Berichte No. 2300, 2017.
Dominique Gruyer et al: "Development of Full Speed Range ACC with SiVIC, a virtual platform for ADAS Prototyping Test and Evaluation" IEEE Intelligent Vehicles Symposium, Jun. 2013, pp. 100-105.

* cited by examiner

REAL-TIME SIMULATION OF A LASER BEAM SCANNING OF A COMPLEX OF SMALL OBJECTS

This nonprovisional application claims priority under 35 U.S.C. § 119(a) to German Patent Application No. 10 2023 116 778.2, which was filed in Germany on Jun. 26, 2023, and to German Patent Application No. 10 2023 117 887.3, which was filed on Jul. 6, 2023, and which are herein incorporated by reference.

BACKGROUND OF THE INVENTION

Field of the Invention

The present invention relates to an acceleration of a computer simulation of a laser beam scanning of a complex of small objects, in particular to accelerate it in a sufficient manner, for the purpose of facilitating the simulation in hard real time at a working speed of a sensor for measuring distance with the aid of a laser beam.

Description of the Background Art

LIDAR sensors (LIDAR=Light Detection and Ranging) are sensors for scanning the surroundings with the aid of shortwave light signals usually in the near-infrared range. By detecting the reflection of the light signal and measuring its circulation time, a LIDAR sensor may generate a three-dimensional map of its surroundings at high resolution. This property makes LIDARs interesting for use in highly automated vehicles which are able to move in unknown surroundings without human control and must perceive their surroundings for this purpose. Many LIDAR sensors use a directed laser beam to scan the surroundings, which is emitted at high frequency in changing spatial directions for the purpose of calculated a point cloud representing the surroundings, based on the reflections.

It has been common for many years to test safety-critical electronic control systems in a virtual environment prior to their series production. Depending on the design of the test object, test methods of this type are known, for example, as software in the loop (SiL), hardware in the loop (HiL), or vehicle in the loop (ViL). The virtual environment is calculated on a simulation computer in real time and comprises a sensor simulation, which calculates sensor signals suitable for the virtual environment and feeds them into the test object, i.e., the control system being tested, for the purpose of testing whether the control system correctly evaluates the sensor signals and responds to them appropriately.

Corresponding sensor simulations are available on the market for testing LIDAR systems, which imitate the function of a LIDAR and are able to synthetically generate the sensor signals of a given LIDAR sensor. To simulate a LIDAR sensor which works with a directed laser beam, in particular, one option is to use a ray casting method for this purpose, since it corresponds to a certain extent to the natural functioning of the actual sensor. The laser beam may be modeled in the virtual environment by a single straight line emanating from the simulated sensor in the virtual environment for the purpose of calculating a point of incidence of the laser beam on a surface of a virtual object in the virtual environment. The point of incidence is then modeled as the source of a simulated reflection of the laser beam.

This method may deliver satisfactory results as long as the laser beam may be approximated as an ideal geometric beam without a beam cross-section. This is generally the case when the laser beam interacts with objects whose dimensions, at least in a first approximation, exceed the beam cross-section by at least one order of magnitude. Examples of objects of this type are buildings, signs, vehicles, people, and land coverage. The method becomes problematic when the virtual environment is to comprise complexes of small objects. A "complex of small objects" can mean a dense local accumulation of objects, each of which is of a similar or smaller order of magnitude than the beam diameter of the laser beam, in at least one spatial direction. Vegetation elements, in particular, frequently form complexes of this type. For example, a grain field is a complex of ears of grain, a meadow is a complex of grasses (and possibly other plants), and leafy plants, bushes, or coniferous trees are complexes of leaves. When the laser beam collides with a small object of this type, the beam cross-section is not negligible. The small object will generally reflect only a portion of the beam intensity, while another portion of the laser beam passes through the small object. A laser beam which strikes a complex of small objects will thus penetrate the complex and, caused by multiple collisions with different small objects, lose intensity as the penetration depth increases. In this case, instead of a single, clearly delimited reflection, the LIDAR sensor registers a temporally distorted reflection signal, made up of a plurality of reflections having different circulation times on different small objects.

To simulate a reflection process of this type in a physically plausible manner by means of classic ray casting or ray tracing, a high-resolution 3D model would be necessary, which models the individual small objects in detail, combined with a ray casting model which takes into account many thousands of rays for sufficiently resolving an extended laser beam. A simulation of this type may not be carried out in hard real time and fast enough with a justifiable degree of complexity.

It is generally known from computer graphics to use stochastic methods for a credible simulation of a distorted light reflection running in real time if a physically correct simulation based on ray casting or ray tracing is too computationally complex. For example, the scientific paper, "Simulation of Realistic Water on 3D Game Scene" (Xiang Xu, Kun Zou, Procedia Engineering 29, 2012), describes a method for a real-time simulation of a reflection on a rippled water surface.

A further example from the field of sensor simulation is found in the scientific paper, "A 3-D Model for Millimeter-Wave Propagation Through Vegetation Media Using Ray Tracing" (Nuno R. Leonor et al, IEEE Transactions on Antennas and Propagation 67(6), 2019). The paper describes the problem of the plausible simulation of a radar echo of a vegetation element against the background of the microstructure formed by the leaves. The proposed approach based on stationary, single-point scattering centers is, however, not applicable to the simulation of a LIDAR operating with a directed and highly collimated laser beam.

A general introduction to the state of the art of the simulation of imaging vehicle sensors for the testing simulation of control systems is found in the scientific paper, "Development of Full Speed Range ACC with SiVIC, a Virtual Platform for ADAS Prototyping, Test and Evaluation" (Dominique Gruyer et al., IEEE Intelligent Vehicles Symposium, 2013).

SUMMARY OF THE INVENTION

It is therefore an object of the invention to accelerate the computer simulation of a laser beam scanning of a complex of small objects, in particular to accelerate it in a sufficient manner, for the purpose of facilitating the simulation in hard real time at the working speed of a sensor for measuring distance with the aid of a laser beam.

To achieve the object, a device is provided for a real-time simulation of a laser beam scanning of a complex of small objects. The device comprises a virtual environment and, as part of the virtual environment, a monolithic 3D model of the complex of small objects.

The monolithic 3D model is advantageously designed in such a way that it does not include a structure in the order of magnitude of the small objects and, in particular, does not comprise a modeling of individual small objects. The 3D model of the complex particularly preferably models the complex solely by means of a surface enveloping the complex. For example, a grain field, a complex of ears of grain in the physical world, may be modeled solely by a cuboid bounding box enveloping the grain field. The bounding box may naturally be provided with a texture suitable for a grain field for the purpose of visualization, but does not comprise any three-dimensional structures for simulating individual ears of grain.

The device further includes a sensor simulation, designed for simulating a sensor for measuring distance with the aid of a laser beam. The sensor simulation comprises a ray casting routine, which is configured to calculate a point of incidence of a laser beam emanating from the sensor with a surface in the virtual environment, to calculate a Euclidean distance of the sensor from the point of incidence and, based on the Euclidean distance, to simulate a distance measurement carried out by the sensor, in particular to generate synthetic sensor signals. The synthetic sensor signals may be fed into a control system being tested for evaluating the sensor signals, for example a LIDAR system, in order to simulate the presence of a sensor for testing purposes.

In addition, a database, in which a plurality of intensity distributions are stored, can be part of the sensor simulation. Each intensity distribution of the plurality of intensity distributions is assigned to an angle of incidence of the laser beam. The design of the intensity distributions is such that an intensity portion of a reflection of the laser beam may be read out from each intensity distribution of the plurality of intensity distributions as a function of a penetration depth of the laser beam into the complex of small objects.

The sensor simulation furthermore comprises a distortion routine, which can be designed to ascertain an angle of incidence of the laser beam on a surface of the 3D model and to select an intensity distribution assigned to the ascertained angle of incidence from the plurality of intensity distributions. The distortion routine calculates a distorted distance measurement, taking into account the Euclidean distance and the selected intensity distribution. In other words, the distortion routine accesses data stored in the intensity distribution to simulate, based on the data, a plurality of reflections of the laser beam penetrating the complex on a plurality of small objects in the complex having different circulation times.

The sensor simulation can be designed to register a collision of the simulated laser beam with a surface of the 3D model of the complex of small objects and, in the case that the point of incidence of the laser beam is on a surface of the 3D model, to call up the distortion routine.

The number of possible angles of incidence of the laser beam is infinite. Consequently, it is, of course, not possible to assign an intensity distribution to each possible angle of incidence. The invention feature "to select an intensity distribution assigned to the ascertained angle of incidence from the plurality of intensity distributions" is therefore to be understood in such a way that an intensity distribution is selected from the finite number of intensity distributions stored in the database, whose assigned angle of incidence is sufficiently similar to the ascertained angle of incidence, in particular as similar as possible. In one expansion stage of the invention, an adaptation of the selected intensity distribution to the ascertain angle of incidence may also be carried out by an interpolation of the selected intensity distribution to a further adjacent intensity distribution in the database.

The calculation of the distorted distance measurement by the sensor simulation based on the intensity distributions may be designed in different ways. In a simple example, the intensity portions of the reflections of different penetration depths are simply read out from the intensity distributions and used directly. The response signal detected by the simulated sensor is then made up of a plurality of reflections, the spatial distance of each individual reflection resulting from the sum of the ascertained Euclidean distance and its penetration depth stored in the intensity distribution.

A disadvantage of simply reading out from the intensity distributions and using such direction is that it may result in an unrealistic sensor simulation, because response signals repeat when their angles of incidence coincide. This disadvantage is particularly problematic in simulated scenarios in which the angle of incidence of the laser beam does not change. One example is a simulation of a highly automated agricultural machine which allows the laser beam of a LIDAR system to pass over a grain field in a circular path without changing the elevation angle. If the 3D model of the grain field is modeled as a bounding box, a constant angle of incidence is present in this case, so that the simulated sensor would detect exactly the same response signal with each scan.

In an advantageous example, the distortion routine is therefore designed to use a random number generator when calculating the distorted distance measurement for the purpose of varying the distorted distance measurements with respect to each other. The distortion routine is particularly advantageously designed to interpret the intensity distributions as probability distributions, from which probabilities for different penetration depths into the complex may be read out for an individual reflection of the laser beam, and to calculate the distorted distance measurement based on the probability distribution. For example, the distortion routine may be designed to simulate a fixedly or variably predefined number of reflections of the laser beam. The distortion routine then accesses the intensity distribution assigned to the angle of incidence and configures a random number generator in such a way that the random number generator generates random numbers whose statistical distribution corresponds to the specification of the intensity distribution. The configured random number generator subsequently uses the distortion routine to assign a penetration depth into the complex to each reflection of the predefined number of reflections and simulates a distorted distance measurement which results from the reflections of the laser beam calculated in this manner.

The generation of the intensity distributions may be based on measures carried out in reality, but it advantageously takes place based on a finely granular 3D model of the complex of small objects which resolves individual small objects, so that the finely granular 3D model permits a local calculation of points of incidence of a laser beam penetrating the complex, based on ray casting. A high-resolution ray casting of a laser beam striking the complex at different angles of incidence is carried out repeatedly on the finely granular 3D model. The laser beam is modeled by a plurality of rays, which in their totality simulate a fanned-out laser beam having an extended beam diameter, i.e., one different than zero.

A corresponding ray cast is carried out for each angle of incidence to which an intensity distribution is to be assigned, and the points of incidence of the plurality of rays on surfaces of small objects in the finely granular 3D model are calculated based on the ray cast. The intensity distribution is then generated by counting the points of incidence as a function of the penetration depth of the rays into the finely granular 3D model. In other words, the intensity distributions are designed in such a way that intervals of penetration depths are plotted on their abscissa, and a variable is plotted on their ordinate which is characteristic for the number of the rays of the particular ray cast which have struck a surface of a small object with a penetration depth within the particular interval and have caused a reflection at the point of incidence.

In the simplest case, if a uniform brightness is assumed for all reflections, the intensity of the reflection of the laser beam corresponding to a penetration depth is in proportion to the particular number of points of incidence. In one expansion stage of the invention, it is, however, also possible to assign an individual brightness to each reflection, for example, taking into account material properties or the size or contact surface area of the surface where the point of incidence is situated.

In an expansion stage of the invention, each intensity distribution of the plurality of intensity distributions can be assigned at least one further parameter in addition to the angle of incidence. The further parameters designate further physical variables, which influence the reflection of the laser beam and may be, for example, the type of vegetation, an expansion angle of the laser beam, a plant density, a row distance, a height of the vegetation, or a degree of ripeness. The distortion routine is designed to select an intensity distribution assigned to the ascertained angle of incidence and the at least one further parameter from the plurality of intensity distributions.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
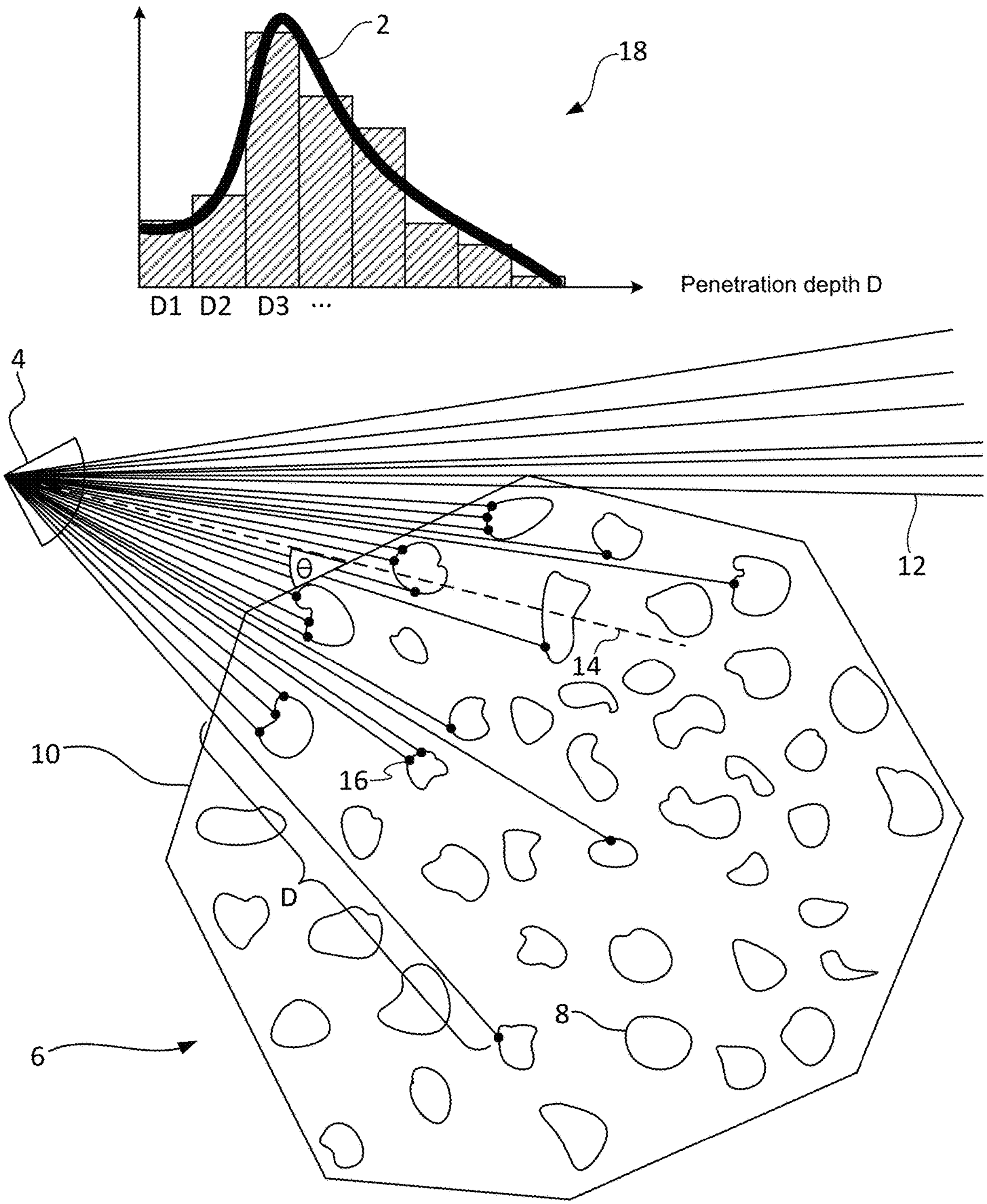
FIG. 1 shows a schematic illustration of a generation of an intensity distribution, based on a finely granular 3D model.

The illustration in FIG. 1 schematically shows the generation of an intensity distribution 2 assigned to an angle of incidence θ. A virtual environment running on a computer-based simulation device for testing a LIDAR system comprises a simulated LIDAR sensor 4 and a finely granular 3D model 6 of a complex of small objects 8. Finely granular 3D model 6 resolves individual small objects 8, thus comprises a detailed 3D modeling of individual small objects 8, and comprises a surface 10 enveloping the complex, which defines an outer boundary of the complex.

A sensor simulation for simulating the LIDAR sensor comprises a ray casting routing. The ray casting routine models the laser beam at high resolution with the aid of a plurality of rays 12, which in their totality result in a high-resolution simulation of a fanned-out laser beam having an extended beam diameter. Each ray 12 is a straight line running through the three-dimensional space of the virtual environment. Rays 12 spread out in a fan-shaped manner from a common source, which is in the same location as the coordinates of simulated LIDAR sensor 4 in the virtual environment. An optical axis 14 of the laser beam abuts enveloping surface 10 of complex 6 at an angle of incidence θ, and the sensor simulation is designed to ascertain angle of incidence θ. For each ray 12, the ray casting routing checks the existence of a point of incidence 16 on a surface in the virtual environment.

A penetration depth D, defined as the distance of particular point of incidence 16 from the penetration point of particular associated ray 12 on enveloping surface 10, is assigned to each ray 12 whose point of incidence 16 is present on a surface of a small object 8.

To generate intensity distribution 2, after a one-time calculation of all points of incidence 16, all points of incidence 16 within the complex, i.e., all points of incidence enveloped by surface 10, are ascertained, and penetration depth D is calculated for each point of incidence 16 enveloped by surface 10. The distribution of penetration depths D is plotted in a histogram 18. Finished histogram 18 plots a number of penetration depth intervals D1, D2, D3, . . . , DN on its abscissa and the number of points of incidence 16 on its ordinate, whose penetration depth D is within the particular interval. By interpolating the quantities plotted on histogram 18, histogram 18 is converted into an intensity distribution 2, and intensity distribution 2 is stored in a database 20 in such a way that intensity distribution 2 is clearly assigned to angle of incidence θ in database 20. The process is repeated many times using different angles of incidence θ to fill database 20 with a plurality of intensity distributions 2, which are each assigned to different angles of incidence θ and rasterize the parameter space of possible angles of incidence θ in a sufficient density. The parameter space to be rasterized by intensity distributions 2 may comprise, in addition to angle of incidence θ, further parameters influencing the reflection of the laser beam, which are varied accordingly during the generation of intensity distributions 2 and to which intensity distributions 2 are assigned in database 20.

In a three-dimensional virtual environment, θ is a solid angle which is made up of an azimuthal angle 6H and an elevation angle $\theta_V$, and intensity distribution 2 is to be assigned accordingly in database 20. In the case of the generation of intensity distributions 2 described above, it is assumed for the sake of simplification that each point of incidence 16 makes a predefined contribution, which is the same for all points of incidence 16, to the temporally distributed intensity of the response signal measured by simulated sensor 4. However, it is naturally also possible to assign an individual intensity to each point of incidence 16. In this case, during the generation of histogram 18, individual points of incidence 16 are to be weighted differently according to the intensity assigned to them in each case.

Figure 2:
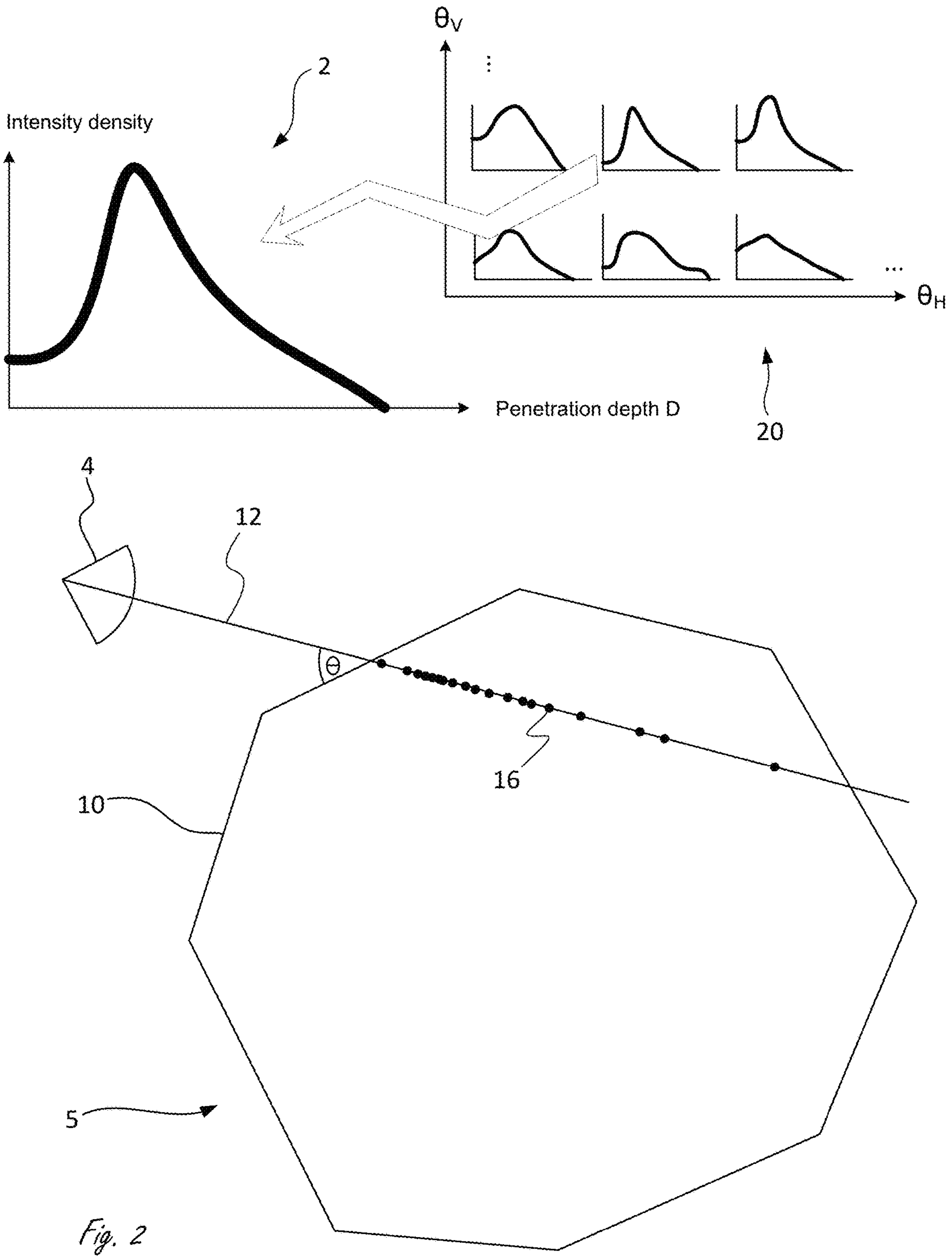
FIG. 2 shows the functioning of a sensor simulation for simulating a plurality of reflections, based on an intensity distribution.

The illustration in FIG. 2 shows the functioning of the sensor simulation during an ongoing real-time simulation after completing database 20. Instead of a high-resolution bundle of rays, the ray casting routine of the sensor simulation calculates only a single ray 12 emanating from simulated sensor 4, which represents the laser beam of LIDAR sensor, but does not take into account a beam diameter of the laser beam. Finely granular 3D model 6 of the complex of small objects 8 is replaced by a simple monolithic 3D model 5, which comprises only enveloping surface 10. The complex of small objects 8 is therefore modeled by a polyhedron during the real-time simulation, for example a bounding box, and does not resolve any small objects 8.

The sensor simulation simulates the functioning of the LIDAR sensor in that it periodically calls up the ray casting routing during the simulation and allows the placement of rays 12 in alternating spatial directions the virtual environment, for example to simulate the scanning of the environment by a circulating laser beam. The sensor simulation calls up the distortion routine whenever the point of incidence of ray 12 is located on enveloping surface 10. The distortion routine ascertains angle of incidence θ of ray 12 on enveloping surface 10 and calls up the suitable intensity distribution 2 from database 20 which is the most similar to ascertained angle of incidence θ with respect to its azimuthal angle 6H and its elevation angle $\theta_V$ (and further parameters to which intensity distributions 2 are assigned in database 20). The distortion routine carries out a correction of called-up intensity distribution 2, based on an interpolation of called-up intensity distribution 2 with at least one adjacent intensity distribution in the database for the purpose of adapting called-up intensity distribution 2 to ascertained angle of incidence θ. The distortion routine interprets intensity distribution 2 corrected in this manner as a probability distribution for penetration depth D of a single given reflection of a laser beam, which strikes the complex of small objects 8 at angle of incidence θ. The distortion routine assigns a penetration depth D to each of a predefined number of reflections of the laser beam to be simulated in that it calls up a random number generator for each reflection to be simulated, which assigns a penetration depth to the particular reflection, using intensity distribution 2, so that a statistical distribution of penetration depths D corresponding to intensity distribution 2 results for the number of reflections.

The virtual environment in which simulated sensor 4 operates comprises two classes of 3D objects, and the sensor simulation is designed to distinguish between the two classes. A first class describes compact objects, which a laser beam is unable to penetrate. Examples are buildings, vehicles, road signs, and people. If the point of incidence of ray 12 is on an object of the first class, the sensor simulation does not call up the distortion routine, but instead simulates the distance measurement only on the basis of the Euclidean distance from simulated sensor 4 to the point of incidence and uses the Euclidean distance (possibly slightly distorted, to simulate a measurement accuracy of sensor 4) as the measured distance of simulated sensor 4.

A second class describes complexes of small objects which may be penetrated by a laser beam. If point of incidence 16 is situated on an object of the second class, the sensor simulation carries out a calculation of the Euclidean distance of point of incidence 16 from sensor 4 in the same manner as described above, but it does not use the Euclidean distance as the measured distance. Instead, the sensor simulation calls up the distortion routine to calculate a plurality of points of incidence with different penetration depths D, as described above. On the basis for the plurality of penetration depths, the distortion routine calculates a distorted distance measurement, which is made up of a plurality of distance measurements corresponding to a plurality of reflections of the laser beam on different small objects 8. For each of points of incidence 16 calculated by the distortion routine, based on the random number generator, a separate measured distance is calculated, which results in each case from the sum of the Euclidean distance and individual penetration depth D of particular point of incidence 16. The distortion routine generates the distorted distance measurement from the totality of all distance measurements calculated in this way. During the calculation of the distorted distance measurement, the distorted function also takes into account, in particular, the different circulation times resulting from the different penetration depths D and simulates a temporally distorted response signal of the laser beam.

The distortion routine outputs the distorted distance measurement to the sensor simulation. The sensor simulation calculates a synthetic sensor signal, based on the distorted distance measurement, which simulates a real sensor signal as would be output by a physical LIDAR sensor, based on a correspondingly distorted distance measurement, and outputs the synthetic sensor signal to an interface of the simulation device. A control system being tested, which is designed to process the sensor signals, may be connected to the interface.

The invention makes it possible to realistically simulate a multiple reflection of a laser beam on a complex of small objects, using a simple ray casting method, which employs only a single ray 12, and a simple 3D model 5, which comprises only an enveloping surface 10. Due to this simplification, the simulation may be carried out with a justifiable degree of complexity in hard real time at the working speed of a physical LIDAR sensor and may consequently be used for testing and developing a control system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for a real-time simulation of a laser beam scanning of a complex of small objects, the device comprising:

a virtual environment, which comprises a monolithic 3D model of the complex of small objects; and a sensor simulator to simulate a sensor for measuring a distance via a laser beam, the sensor simulator comprising:

a ray casting routine to calculate a point if incidence of a laser beam emanating from the sensor on a surface in the virtual environment and, based on an ascertainment of a Euclidean distance of the sensor from the point of incidence, to simulate a distance measurement carried out by the sensor;

a database that comprises a plurality of intensity distributions, each intensity distribution of the plurality of intensity distributions being assigned to an angle of incidence θ of the laser beam, and an intensity portion of a reflection of the laser beam being adapted to be read out from each intensity distribution of the plurality of intensity distributions as a function of a penetration depth of the laser beam into the complex of small objects; and a distortion routine to ascertain an angle of incidence θ of the laser beam on a surface of the 3D model, to select an intensity distribution assigned to the ascertained angle of incidence θ from the plurality of intensity distributions, and to calculate a distorted distance measurement, taking into account the Euclidean distance and the selected intensity distribution, wherein the sensor simulator calls up the distortion routine in the case that the point of intersection of the laser beam is situated on a surface of the 3D model to simulate a plurality of reflections of the laser beam on a plurality of small objects.

2. The device according to claim 1, wherein the complex of small objects is:

a vegetation element or a complex of ears of grain or a grain field, a complex of grasses or a meadow, a complex of leaves or a leafy plant, a bush, and/or a coniferous tree.

3. The device according to claim 1, wherein the small objects are of a similar or lower order of magnitude than the beam diameter of the laser beam, so that the laser beam penetrates the complex of small objects and, by reflection on a plurality of small objects loses intensity as the penetration depth D increases.

4. The device according to claim 1, wherein the 3D model of the complex does not comprise a modeling of individual small objects.

5. The device according to claim 4, wherein the 3D model is a surface that envelops the complex.

6. The device according to claim 1, wherein each intensity distribution assigns a variable to different penetration depths in each case, which is characteristic for a number of reflections, each number of reflections corresponding to a number of points of incidence of a high-resolution, simulated laser beam, which is modeled by a plurality of rays in a finely granular 3D model of the complex, which resolves individual small objects.

7. The device according to claim 6, wherein the sensor simulation ascertains the intensity portion by taking into account the number of points of incidence.

8. The device according to claim 2, wherein each intensity distribution is assigned at least one further parameter in addition to the angle of incidence, and the distortion routine is designed to select an intensity distribution assigned to the ascertained angle of incidence and the at least one further parameter from the plurality of intensity distributions, and wherein the at least one further parameter includes:

type of vegetation, expansion angle of the laser beam, plant density, row distance, height of the vegetation, and/or degree of ripeness.

9. The device according to claim 1, wherein the sensor simulation generates synthetic sensor signals of the sensor to simulate a presence of a sensor in a control system being tested for evaluating the sensor signals, the control system comprising a LIDAR system (Light Detection and Ranging).

10. A method for a real-time simulation of a laser beam scanning of a complex of small objects, the method comprising:

performing a sensor simulation of a sensor to measure distance via a laser beam in a virtual environment, which comprises a monolithic 3D model of the complex of small objects via a ray casting routine, which is configured to calculate a point of incidence of a laser beam emanating from the sensor with a surface in the virtual environment and, based on an ascertainment of a Euclidean distance of the sensor from the point of incidence, to simulate a distance measurement carried out by the sensor;

ascertaining an angle of incidence θ of the laser beam on a surface of the 3D model;

selecting an intensity distribution assigned to the angle of incidence θ from a database, which comprises a plurality of intensity distributions, each intensity distribution of the plurality of intensity distributions being assigned to an angle of incidence of the laser beam, and an intensity portion of a reflection of the laser beam being read out from each intensity distribution of the plurality of intensity distributions as a function of a penetration depth of the laser beam into the complex of small objects;

calculating a distorted distance measurement, taking into account the Euclidean distance and the selected intensity distribution, to simulate a plurality of reflections of the laser beam on a plurality of small objects.

11. The method according to claim 10, further comprising:

calculating synthetic sensor signals of the sensor based on the distorted distance measurement; and feeding the synthetic sensor signals into a control system being tested for evaluating the sensor signals, the control system comprising a LIDAR system (Light Detection and Ranging).

12. The method according to claim 10, further comprising:

providing a finely granular 3D model of the complex of small objects in the virtual environment, which resolves an individual small object;

repeatedly calculating the points of incidence of a plurality of rays on surfaces of small objects in the finely granular 3D model, the plurality of rays in their totality simulating a fanned-out laser beam having an extended beam diameter, for a plurality of angles of incidence; and generating the intensity distributions by counting the points of incidence as a function of the penetration depth of the rays into the finely granular 3D model.

* * * * *